United States Patent
Hawkins, III

(10) Patent No.: US 9,511,285 B2
(45) Date of Patent: Dec. 6, 2016

(54) NETWORKED COMPUTER GAME SYSTEMS AND METHODS WITH SOCIAL NETWORK FUNCTIONS

(75) Inventor: William M. Hawkins, III, San Mateo, CA (US)

(73) Assignee: Kabam, Inc., San Francisco, CA (US)

( * ) Notice: Subject to any disclaimer, the term of this patent is extended or adjusted under 35 U.S.C. 154(b) by 702 days.

(21) Appl. No.: 13/073,059

(22) Filed: Mar. 28, 2011

(65) Prior Publication Data

US 2011/0275442 A1 Nov. 10, 2011

Related U.S. Application Data

(60) Provisional application No. 61/318,121, filed on Mar. 26, 2010.

(51) Int. Cl.
*A63F 13/30* (2014.01)
*G06Q 10/00* (2012.01)

(52) U.S. Cl.
CPC .............. *A63F 13/30* (2014.09); *G06Q 10/00* (2013.01)

(58) Field of Classification Search
USPC ............................................. 463/42
See application file for complete search history.

(56) References Cited

U.S. PATENT DOCUMENTS

| | | |
|---|---|---|
| 6,009,458 A | 12/1999 | Hawkins et al. |
| 2005/0209002 A1 | 9/2005 | Blythe et al. |
| 2006/0054679 A1* | 3/2006 | Ruping ................... A63F 13/00 235/375 |
| 2006/0287096 A1* | 12/2006 | O'Kelley, II ........... A63F 13/12 463/42 |
| 2007/0060335 A1* | 3/2007 | Sakaguchi .............. A63F 13/10 463/30 |
| 2008/0009345 A1 | 1/2008 | Bailey et al. |
| 2008/0113770 A1 | 5/2008 | Gelber et al. |
| 2008/0220840 A1 | 9/2008 | Katz et al. |
| 2010/0144440 A1* | 6/2010 | Arrasvuori .............. A63F 13/12 463/42 |

OTHER PUBLICATIONS

The International Search Report corresponding to the PCT/US11/30184 application.

* cited by examiner

*Primary Examiner* — Tsan-Yu J Huang
(74) *Attorney, Agent, or Firm* — Sheppard Mullin Richter & Hampton LLP

(57) ABSTRACT

Systems and methods for providing online games, including various means of providing computer-implemented games using standard and non-standard tokens, and that operate in coordination with an online social network. Examples of standard tokens may include tokens associated with each card of a standard 52 card deck, units in a real-time strategy game, and the like. Non-standard tokens may represent digital tokens with specified attributes and associated digital rights management for use by specified users, such as users purchasing rights to a particular non-standard token. Non-standard tokens may also include tokens with different functionality across a number of different computer-implemented games.

16 Claims, 9 Drawing Sheets

NETWORKED COMPUTER GAME SYSTEMS AND METHODS WITH SOCIAL NETWORK FUNCTIONS

RELATED APPLICATIONS

The present application claims priority to U.S. Provisional Application No. 61/318,121, entitled Networked Computer Game Systems and Methods With Social Network Functions, filed Mar. 26, 2010, the contents of which are hereby incorporated by reference herein in its entirety.

BACKGROUND OF THE INVENTION

The present invention relates to systems and methods for providing online games, including games, generally played on a computer and other mobile devices, that include social network functions. Disclosed embodiments may find particular applicability with games that allow user to acquire rights to digital tokens that have different functionality across a spectrum of computer-implemented games, and with computer-implemented games that combine variable-use digital tokens with other standard gaming tools and constructs, such as real-time strategy games, card games, etc.

In most games that use tokens, such as trading cards, the tokens are limited to a set of functions defined by a single game. An exception to this would be U.S. Pat. No. 6,009,458, which describes a system including "persistent playing object" that may use generic attributes of an object to map to game-specific attributes.

Multiplayer games have been developed that allow users to connect directly, or via computer game servers, and participate in games with several, or even thousands of, other players. Additionally, computer-based social networks have been developed to allow people from all over the world to establish and maintain connections with other users having shared interests, history, and other factors.

It would be desirable to have new game systems and methods that build on the connectivity and features provided by online social networks, and that also include expanded functionality and user participation through the use of digital tokens. Such games may include functions related to, for example, registered "friends" of a user in an online social network, and digital tokens having cross-platform applicability and digital rights management.

BRIEF SUMMARY OF THE INVENTION

Disclosed systems and methods may include various means of providing a computer-implemented game that use standard and non-standard tokens, and that operate in coordination with an online social network. Examples of standard tokens may include tokens associated with each card of a standard 52 card deck, units in a real-time strategy game, and the like. Non-standard tokens may represent digital tokens with specified attributes and associated digital rights management for use by specified users, such as users purchasing rights to a particular non-standard token. Non-standard tokens may also include tokens with different functionality across a number of different computer-implemented games.

Embodiments may include providing, by a computer processor, instructions for displaying a first display to a user. The first display may include one or more icons including, for example, a first icon and/or a second icon. The first icon may represent a member of an online social network that is a registered friend of the user and that is playing the same game as the user. The second icon may represent a member of the social network that is not a registered friend of the user and that is playing the game.

Embodiments may include initiating a game instantiation based on a user selection of at least one of the first icon and the second icon. A request may be sent to the registered friend of the user based on a selection of the first icon. If the registered friend accepts the request, a game may be started by a computer processor with the user and the registered friend as participants of the game. Alternatively, a game may be started by the computer processor with the user and without the registered friend as participants of the game. For example, the user may play the game against a simulated player, or artificial intelligence, acting as the opposing player. In embodiments, the simulated player may use a plurality of different parameters related to and/or set by the registered friend. For example, the simulated player may use digital tokens in the game that the registered friend has rights to, the simulated player may use a configuration of standard and/or non-standard tokens set by the registered friend, and the like. In embodiments, the game without the registered friend participating may include at least one predetermined parameter set by the registered friend.

Embodiments may include sending a friend request to the member of the social network that is not a registered friend ("non-friend") of the user based on a selection of the second icon. If the non-friend accepts the friend request, the non-friend may be registered as a new friend of user in the social network and/or a game may be started by the computer processor with the user and the new friend as participants. If the non-friend refuses, or fails to reply to the request, a game may be started with the user and without the non-friend as participants, or the game instantiation may be canceled. In the event that a game is started with the user and without the non-friend as participants the game may include at least one predetermined parameter set by the non-friend of the user.

Embodiments may include providing a user with a standard token from a first set of tokens. The first set of tokens may be shared and substantially identical between a plurality of users playing the game, such as a set of standard tokens representing, units in a real-time strategy game, each card of a standard 52 card deck, blocks in a building game, etc. Different players first sets of tokens may have slight variations, such as color, graphical representation, minor attribute variations, and the like, within the definition of substantially identical.

Rights of a user to non-standard tokens from a second set of tokens may be verified by automated processes including, for example, accessing a database by a computer processor to review digital rights stored in the database. Users may be provided at least one non-standard token from the second set of tokens based on the automated verification. In embodiments, users may be provided a limited set of non-standard tokens in the event that they have no specific rights to the non-standard tokens, e.g. users may be provided an "introductory" set of non-standard tokens with which to play a game, rather than non-standard tokens to which they have specific rights. In embodiments, computer-implemented games described herein may be provided in coordination with and/or via a social networking site.

Embodiments may include receiving over an electronic network a first instruction from the user to use a non-standard token during a game. Based on the first instruction, a second instruction may be executed, e.g. by a computer processor, that modifies an attribute of at least one standard token that has been provided to one of the users playing the game and/or a non-standard token provided to one of the users playing the game. Embodiments may include restricting the further use of the non-standard tokens that have been used by the user. After a period of time, or other criteria, the user may be provided with an option to make the used non-standard tokens useable again.

Embodiments may include similar second instructions that, for example, change a defense, strength, and/or speed attribute of a gaming unit, change possession of a standard token among the plurality of users playing the game, change possession of a non-standard token among the plurality of users playing the game, remove a standard token from play in the game, remove a non-standard token from play in the game, add a bonus score to a user, deduct a score from a user, prevent the use of a non-standard token, change a suit of a standard token provided to one of the users playing the game, and/or change a value of a standard token provided to one of the users playing the game.

In embodiments, the first set of tokens may consist of a pool of possible tokens corresponding to units for a real-time strategy game.

Embodiments may include calculating one or more user scores based on attributes of the standard and non-standard tokens, including modified attribute of the tokens, and determining a winner of the game based on the calculated user scores. Scores may be calculated, for example, at a given point during the game and/or calculated on an ongoing basis. User profiles may be updated in a database to reflect the results of the game, including, for example, modifying in the database a score representing a player's skill and the like. Such scores can then be used later to perform other automated tasks such as matching players by skill, and the like.

Embodiments may include applying different rules in different games based on the use of the same non-standard token. For example, a particular non-standard token may be operable to perform a first set of functions in a first game, and operable to perform a different second set of functions in a second game. The non-standard token may also have different visual features in the different games.

Further advantages of the present subject matter will become apparent to those of ordinary skill in the art upon reading and understanding the following detailed description of the preferred embodiments.

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein.

Figure 1:
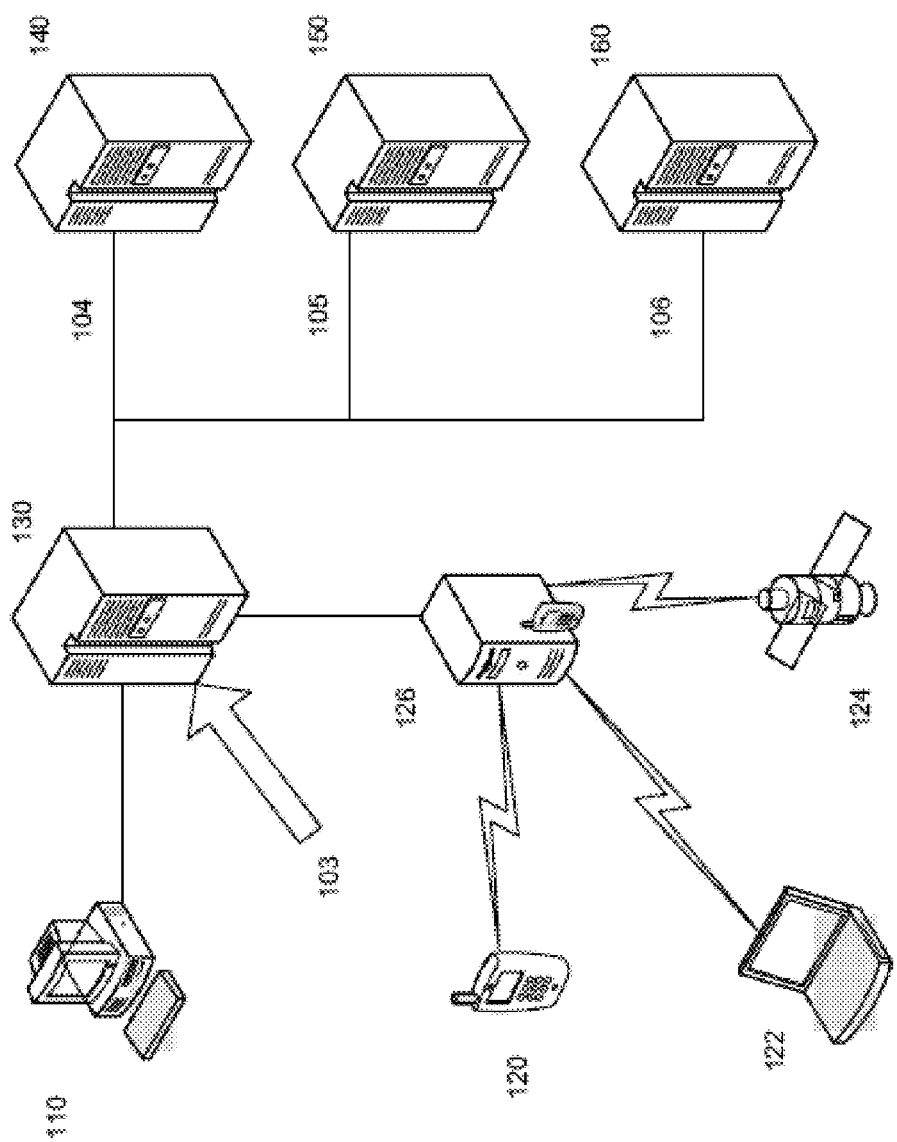
FIG. 1 depicts an exemplary system and related network in accordance with an embodiment of the present invention.

As indicated above, embodiments of the present invention may involve operations on a network, such as the Internet environment depicted in FIG. 1. A client computing device 110 may interact with various servers, 130, 140, 150, 160, and/or other computing and mobile devices 120, 122, to participate in a computer-implemented game. Information 103 may be exchanged through, and/or among, any of the nodes on the network, including transmissions through alternative networks such as various WLAN, cellular and/or satellite communication networks between intermediate server(s) 126 and remote devices such as handheld device 120, mobile computing device 122 and satellite network devices 124. One or more servers 140, 150, 160 may act alone or in combination with other servers and/or databases to present customized gaming interfaces, and gameplay, to participating users. For example, a server 140 may act as a game host for a particular Internet-based game (e.g. "game 1"), and access a common database maintained by server 150 with user information related to, for example, rights to digital tokens for use in game 1 and other games. As known by those of skill in the art, such games may also be supported by client-side applications that may provide, for example, user interfaces, customized displays, independent access to databases including user information, and the like.

For ease of explanation, particular online games, including a siege-style real-time strategy ("RTS") game using standard units and digital token-based "Heroes", and a game including the use of a standard 52 card deck ("playing cards") with a set of non-standard tokens, referred to as "Noble" cards, are described. Other games and implementations are, of course, contemplated within the scope of the disclosure.

In an embodiment, the system may be configured to allow the initial set up, and subsequent play, of standard units, with tokens from a non-standard deck ("Heroes") being used to modify the play. The system is configured to allow the Heroes to modify play in a number of manners. In general, and as described further below, the systems may be configured to allow Heroes to, for example, change a defense, strength, and/or speed attribute of a gaming unit, change possession of a standard token among the plurality of users playing the game, change possession of a non-standard token among the plurality of users playing the game, remove a standard token from play in the game, remove a non-standard token from play in the game, add a bonus score to a user, deduct a score from a user, prevent the use of a non-standard token, change a suit of a standard token provided to one of the users playing the game, and/or change a value of a standard token provided to one of the users playing the game.

Figure 2:
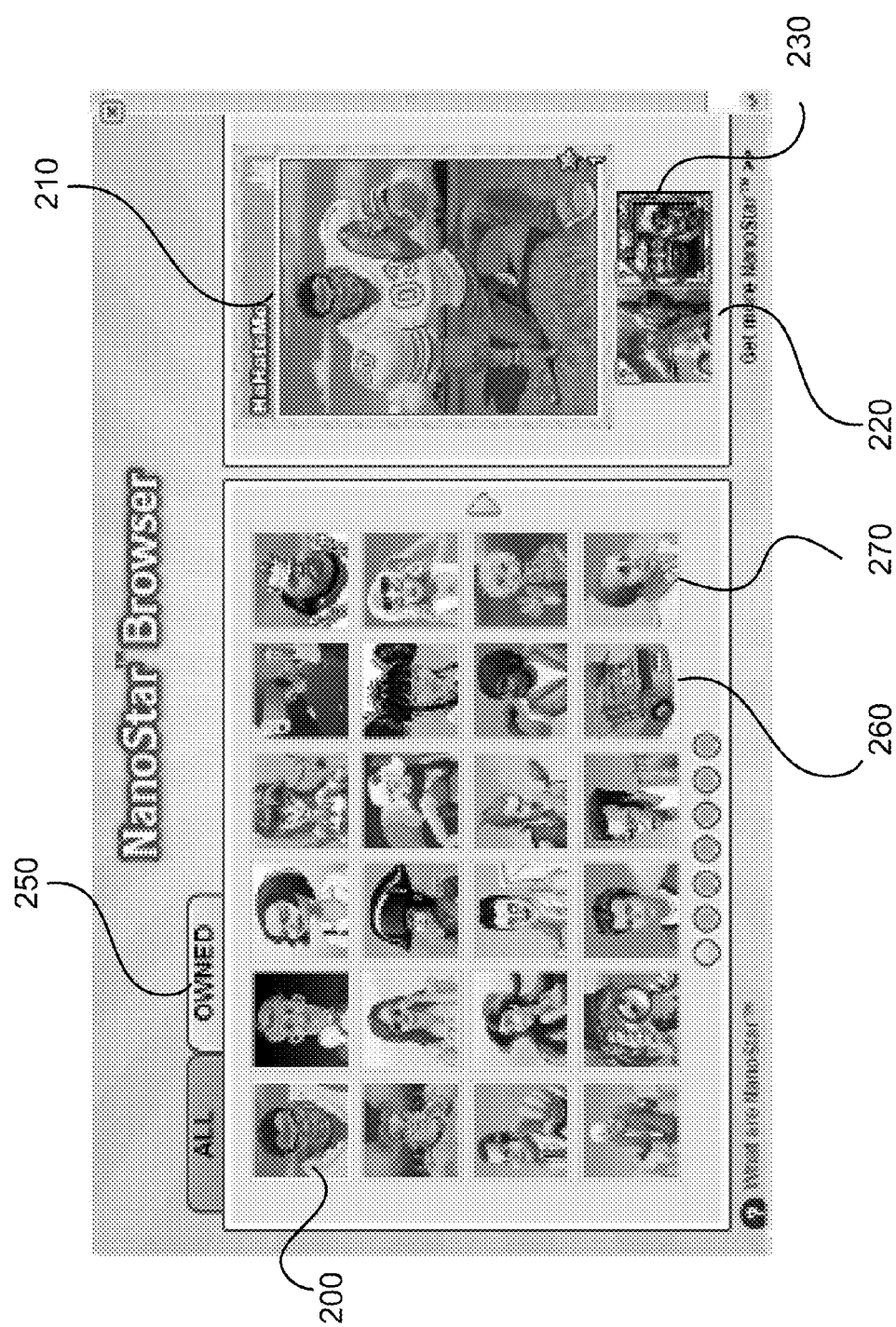
FIG. 2 depicts a display representing aspects of exemplary digital tokens in accordance with an embodiment of the present invention.
Figure 4:
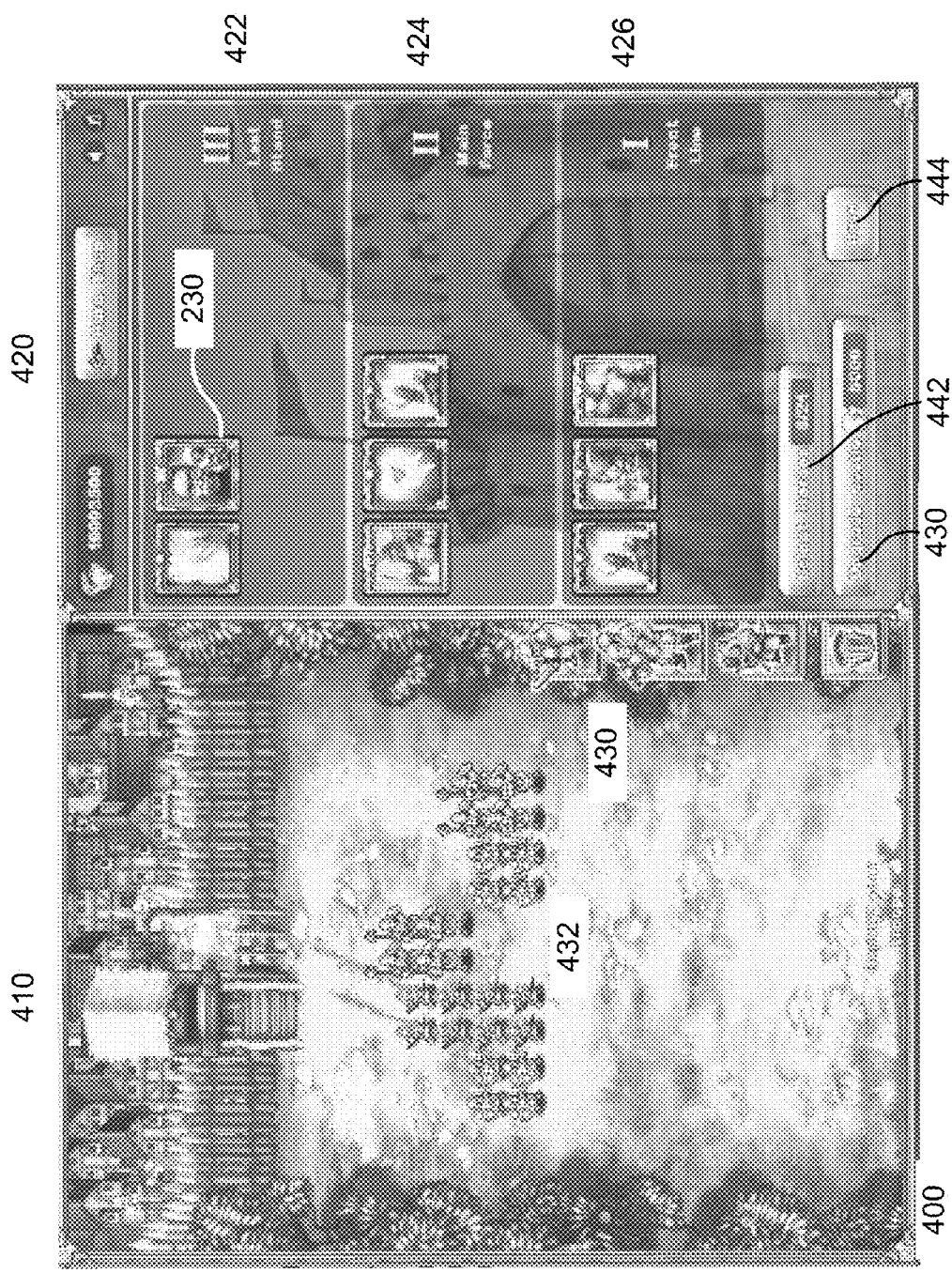
FIG. 4 depicts an exemplary user-side display of a defense-setting screen in accordance with an embodiment of the present invention.

Aspects of an exemplary assortment of non-standard tokens, are depicted in FIG. 2. As shown in FIG. 2, a digital token 200 may have a visual representation 210 for purposes of purchasing the token and displaying the token outside of particular gameplay, and may have additional visual representations 220, 230 for use in particular games. A user may be able to view a "deck" 250 of the tokens they have rights to or have assembled for particular uses, and store designated decks locally, or through the token management, and/or game, database servers. For example, as shown in FIG. 4, a user may select from their available tokens 410, on the left, to assign them to a particular deck, or functional group 420, 430, 440, on the right, before or during a game. In particular, FIG. 4 shows a pre-configuration screen for a user to set a desired arrangement of tokens for use in a defensive battle. As discussed further below, embodiments may include initiating a game in which a simulated player ("AI") uses the tokens assigned to a player and predetermined rules set by the player to play a game. The graphical display shown in FIG. 4 may have a game-specific graphic for a token, such as the tokens 450, 460, 470 shown on the right side of FIG. 4. As discussed further below, the tokens may have different functionality assigned, depending on the game it is used in.

Figure 3:
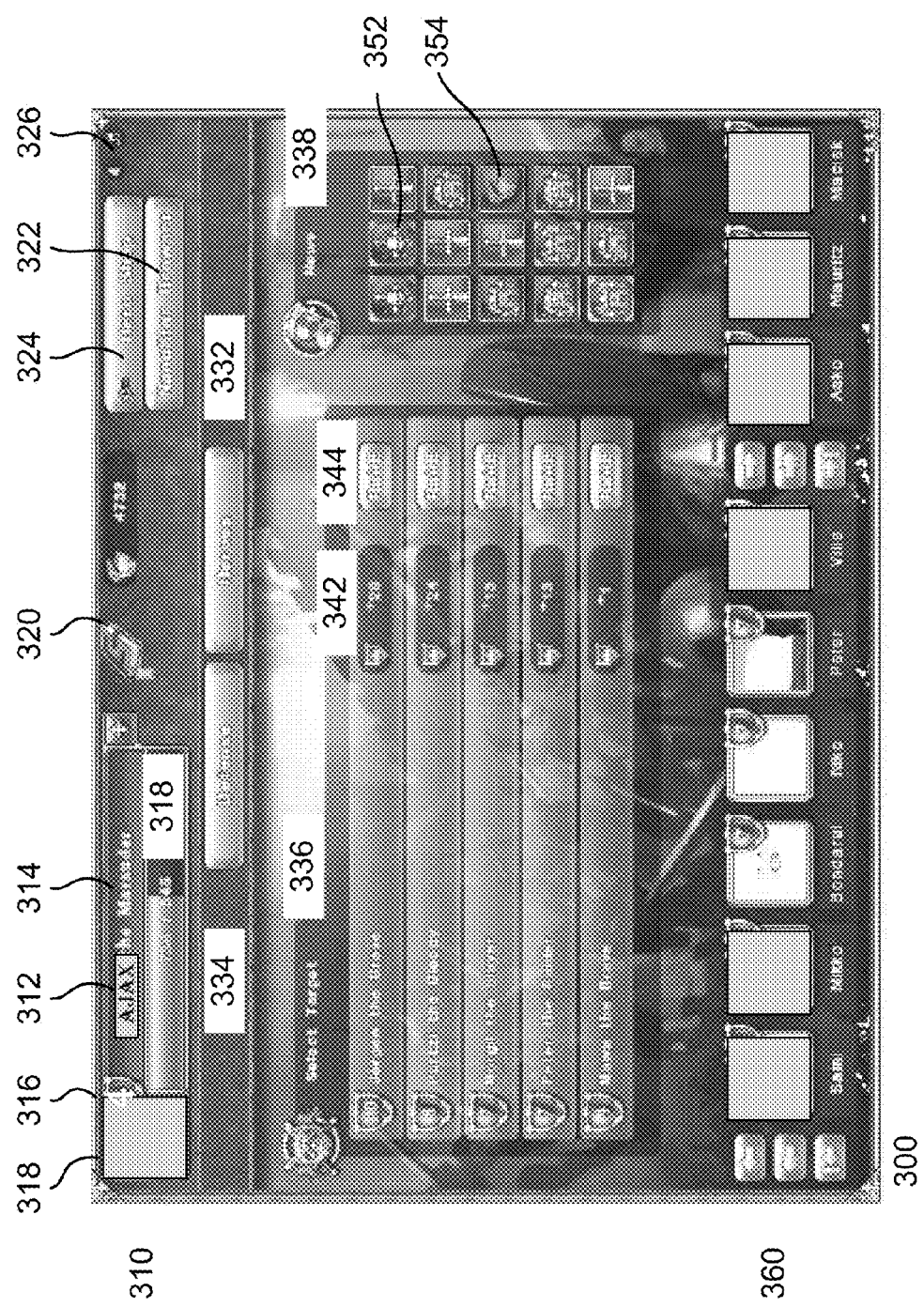
FIG. 3 depicts an exemplary user-side display of a game initiation screen in accordance with an embodiment of the present invention.

As shown in FIG. 3, embodiments may include presenting an initial game screen 300 to a user. This screen may be accessed through, or presented in coordination with, a social networking site. For example, a user may be logged on to their network id, and the information presented to the user may be tailored based on attributes of their id, such as who are the registered friends of the user, what is the user's rank in a particular game, what is the user's recent history in the game and/or related games and other applications, etc.

The initial screen 300 may include a top part "HUD" 310 with, for example, a player name 312, title 314, level 316 and current experience points 318, show on the top left corner of the screen in FIG. 3. A player image 318 may also be provided, for example, from the online social network user's image. A player level 316 may be shown as a number, such as in a shield next to the user image.

Next to the player information, functional icons may be include such as a "bookmark" 320 button that may be configured to bookmark the application/game for the user. Additional icons may also be included such as, in the top right corner of the screen, gateway buttons to a browser 322 related to the non-standard tokens, a shopping link 324, and sound and/or other control buttons 326.

At the bottom of the top HUD 310 are the gateway buttons to the Heroes 332 and Defense 334 screens for an RTS embodiment described herein. The middle of the main screen is divided between the target list 336 on the left and the recent game news 338 on the right. The target list 336 is divided into five shortlisted opponents that are either slightly below (e.g. blue color), the same (e.g. green color) or higher (e.g. red color) level than the player. That is, the system may automatically select a range of opponents for the user based on, for example, their skill level and the user's skill level. The target list shows the enemy name/title/image, level and the amount of experience points 342 the player will get for winning the fight. The enemies may be selected by clicking the "Raid" button 344 next to the experience amount. As discussed herein, initiating a game via the raid button 344 may result in a number of actions by the processor including, for example, instantiating a game using an AI opponent that acts in accordance with predetermined criteria of the opposing player the AI is standing in for.

To the right of the screen, a news area 338 may show icons representing various events that have happened to the player, such as in the last 12 hours. These can be attacks from other players, taxes, records of the player's own actions or news/promotional items that can be viewed by clicking the icons. The event screens are pop-up boxes that are accessed by clicking the icons that are under the "News" area in the main screen. These may be generated automatically either when the player attacks (or is attacked by) other players (raid events), the player receives news and/or in-game promotions (news events) or when the player is able to collect taxes 354 (tax events). By including perishable clickable events in the news area 338, that can also benefit the player, increased user interaction may be promoted. Events generally show relevant information to the event and may have bonuses for the player to collect after viewing the event. In embodiments, if the player has been "raided" by other players, he can be provided with an option to activate a "revenge attack" e.g. by clicking a revenge button 352. This will take him directly to the enemy view and he can initiate a counter-raid against the player that raided him previously. This can be advantageous in providing an efficient user interface for a user to selectively initiate games against those players that have recently caused a loss to the user.

The bottom part of the initial screen may show a friend bar 360 with the player's friends (i.e. people who are both playing the same game and are registered with the online social network as friends of the player). These icons may show the friend's name, picture and level. Clicking on a friend's image/icon may initiate a game instantiation, e.g. begin a game where the user is on offense against a real-time, or pre-made, defense of the selected friend.

The friend bar may also show "unknown" people that may be playing the game, but are not currently registered friends of the user, "non-friends". Clicking on these icons/images may generate a friend request, and/or a game invite.

As shown in FIG. 4, embodiments may also include a defense screen 400 in which a user may preconfigure rules and attributes to be used, for example, in automated defense games.

For example, clicking the Defense button 334, as shown in FIG. 3, may take the player to the defense screen shown in FIG. 4. The defense screen may allow the player to edit his defense by positioning new troops in battlefield portion 410, selecting which Heroes, i.e. non-standard tokens, to use via interaction with token-use portion 420, and by purchasing fortification upgrades such as by clicking on upgrade icon 430. The player can place/remove units 432, i.e. standard tokens, freely in the screen 410 by using a mouse, and the like. New units may be placed by clicking on the unit icons 440 in the middle of the screen and then selecting a location for the unit. The amount of units the player can field may depend on his level. Existing units 432 may be moved around by "drag-dropping" them around the play area or removed by dragging them outside the play area. The configuration of units set by the user, including number, type and positioning, may then be used by an AI defense when the user is raided by another player.

The right side of the defense screen 400 including token-use portion 420 displays the various non-standard tokens, "Heroes," currently used in the defense. These are divided into three "Guards" which are labeled "Front Line" 426, "Main Force" 424 and "Last Stand" 422. Heroes in the Guards may be used on different areas of the battlefield 410. These areas may be shown when the player mouses over a Guard in the HUD. Mousing over a Hero may display more information in a tooltip. Below the Guards are gateway buttons to the Hero editing (Select Heroes icon 442), defense upgrades (Upgrade Castle icon 430) or exit the screen (Save icon 444).

Figure 5:
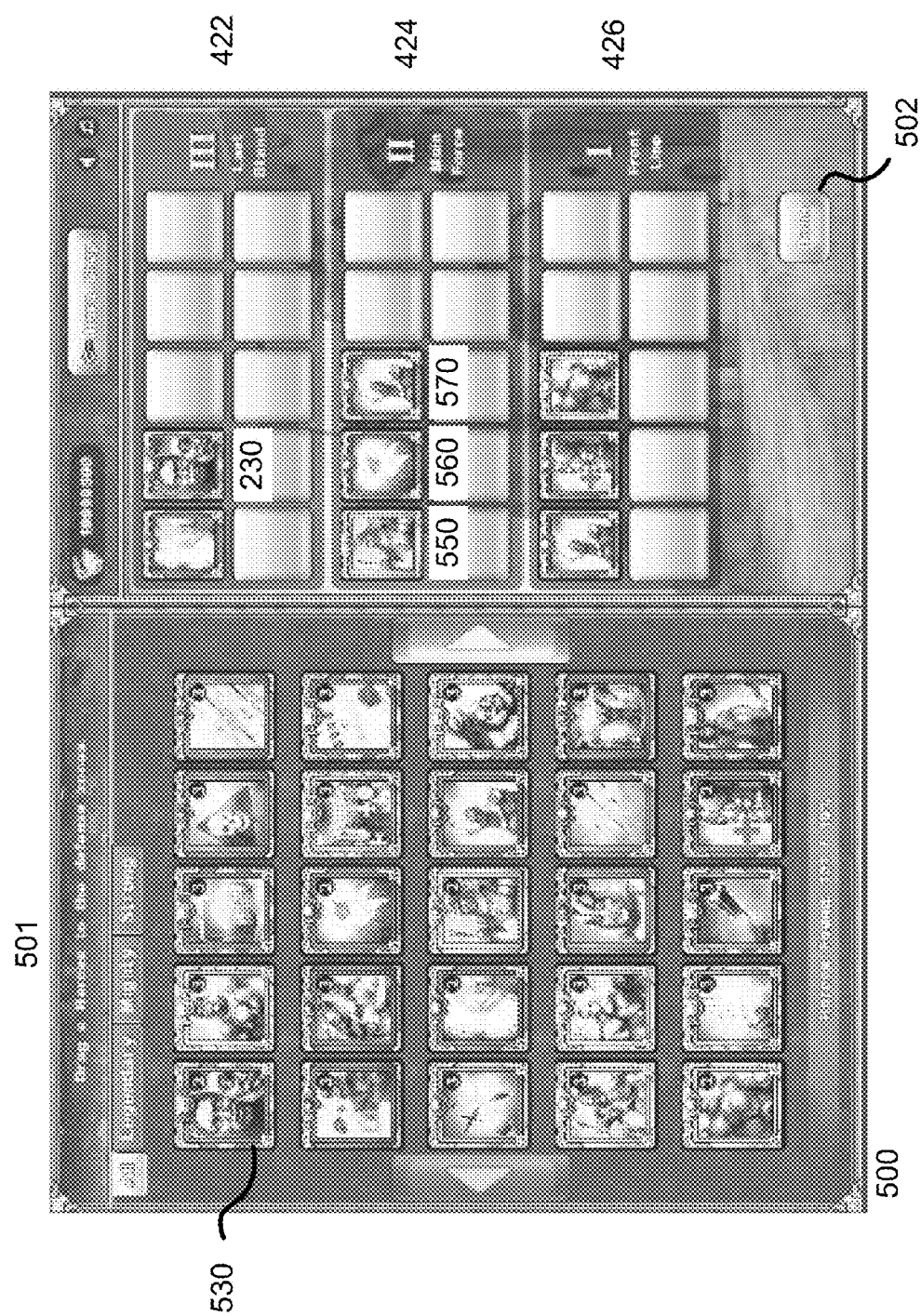
FIG. 5 depicts an exemplary user-side display of a selection screen for a game in accordance with an embodiment of the present invention.

The Heroes used for defense may be modified through the use of, for example, a Defense Hero Select Screen 500 as shown in FIG. 5. This screen 500 may be accessed, for example, by clicking the "Select Heroes" button 442 (or any of the Guards) in the defense screen of FIG. 4. In the Defense Hero Select Screen 500 the player can edit the Heroes he wishes to use in the defense. As shown in FIG. 5, the right side of the HUD shows the different Guards 422, 424, 426, the number of available slots the player can still use, and the Heroes that have already been selected 230, 550, 560, 570. For example, in the screen 500, three different Guard units 422, 424, 426 may be seen including a Front Line I 426, Main Force II 424, and Last Stand III 422. In embodiments, the game application may be configured for the AI to apply different rules to the different Guard groups, e.g. when to activate or use the Heroes, and the like. More information on the Heroes can be seen by mousing over the Hero icon 230, 550, 560, 570. Mousing over a locked Guard slot may display the level the player needs to achieve to unlock the slot.

On the left side 501 of the screen the player can see all the digital tokens, e.g. Heroes, that he "owns" or otherwise has digital rights to. In embodiments, digital tokens may be purchased, rented, traded, and otherwise managed in accordance with digital rights mechanisms. The system may sort the Heroes by power (legendary-mighty-strong) and the user may select sorted groups by using the tabs at the top of the HUD.

The player can drag and drop Heroes from the collection side 501 to the Guards 422, 424, 426. The screen may be exited by clicking the "done" button 502 at the bottom right corner of the screen, which can instruct the system to save all of the parameters regarding units and Heroes for later use, for example, by an AI defense. Embodiments may also include providing the user with an option of improving a static defense such as will be used by the AI for raids against the user, such as "upgrading" a castle. By clicking the "Upgrade Castle" button, the player can invest money and/or game rewards, such as gold etc., in upgrading/customizing his defenses.

Figure 6:
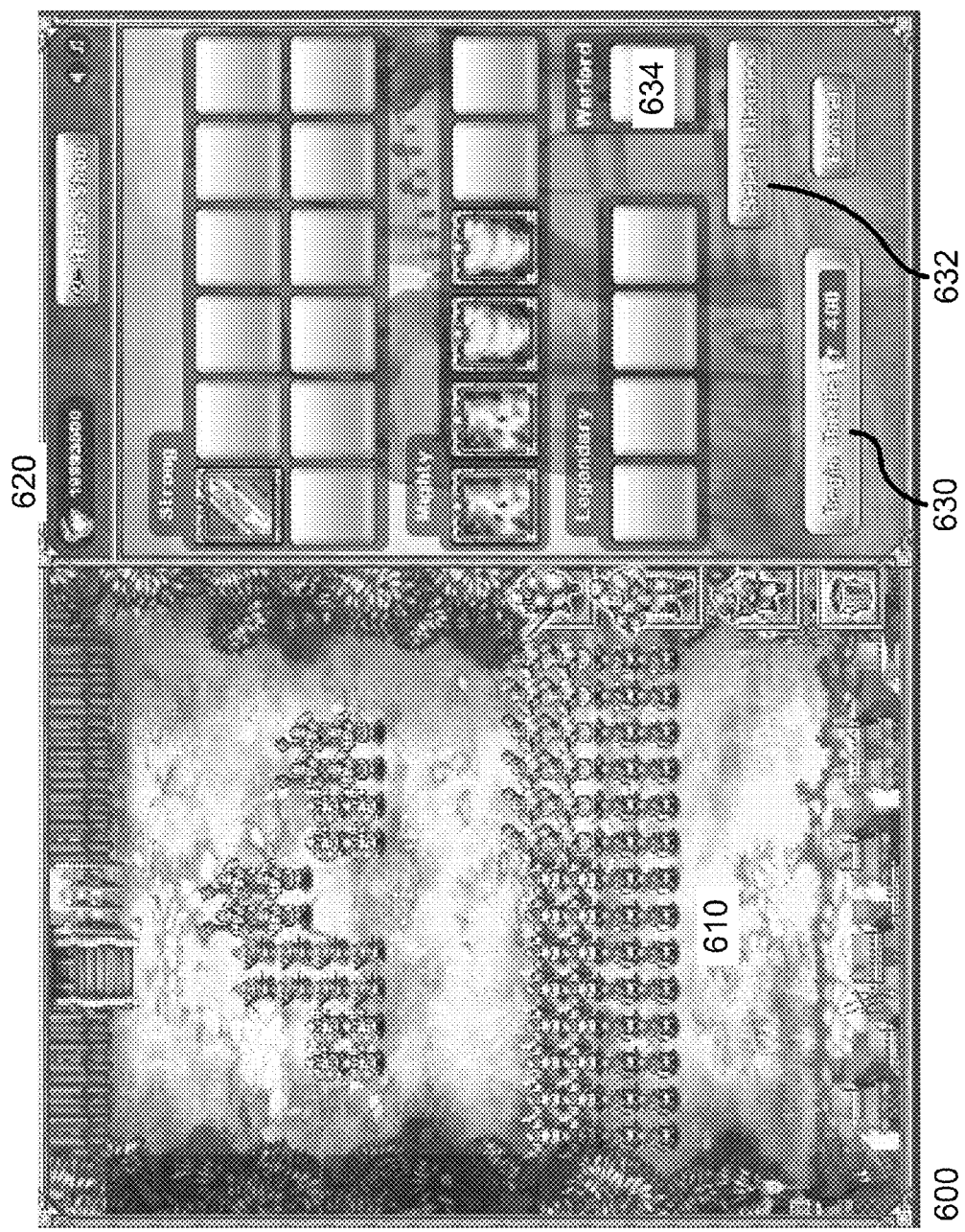
FIG. 6 depicts an exemplary user-side display of a selection screen in accordance with an embodiment of the present invention.

When a particular game is begun by a user, and the user will be on offense, i.e. "attacking", the user may be provided with a Deployment Screen 600, such as shown in FIG. 6. This screen may allow the user to configure his attack troops. The standard tokens, or units 610, may be deployed in a similar manner as in the defense screen 400. In embodiments, the user may pay for additional units from game rewards and the like, thereby changing the balance of power for the particular game. This may be advantageous in allowing a lower level player to compete against a higher level player, for a price. That is, instead if automatically handicapping the opponents, the level of handicapping may be left to the user. The system may have limits built in to thus, such as a maximum number of units, and/or limits may be imposed by resources available to the user, e.g. an amount of game gold 620.

The system may be configured to allow a number of units without fee, and to accumulate a battle price, for any additional units, that the player has to pay before the fight can start. The battle price may be shown in the "Begin Battle" button 630, as shown in FIG. 6. If the player is unable to pay the cost, the "Begin Battle" button 630 may be disabled until the player removes enough units to afford the price.

In addition to the units, the player can choose which Heroes to include in his army for the battle. The number and type of Heroes the player is allowed to take with him may depend on the player's experience level, or other factors. The Heroes may be selected by clicking the "Select Heroes" button 632, which may take the user to a screen, similar to that depicted in FIG. 4, including all of the digital tokens that the user has digital rights to and that are compatible with the game and any relevant other criteria. The Heroes available for the game may be limited, for example, by a number of Heroes per level, a total number of Heroes, a handicapped number of Heroes, etc.

Figure 7:
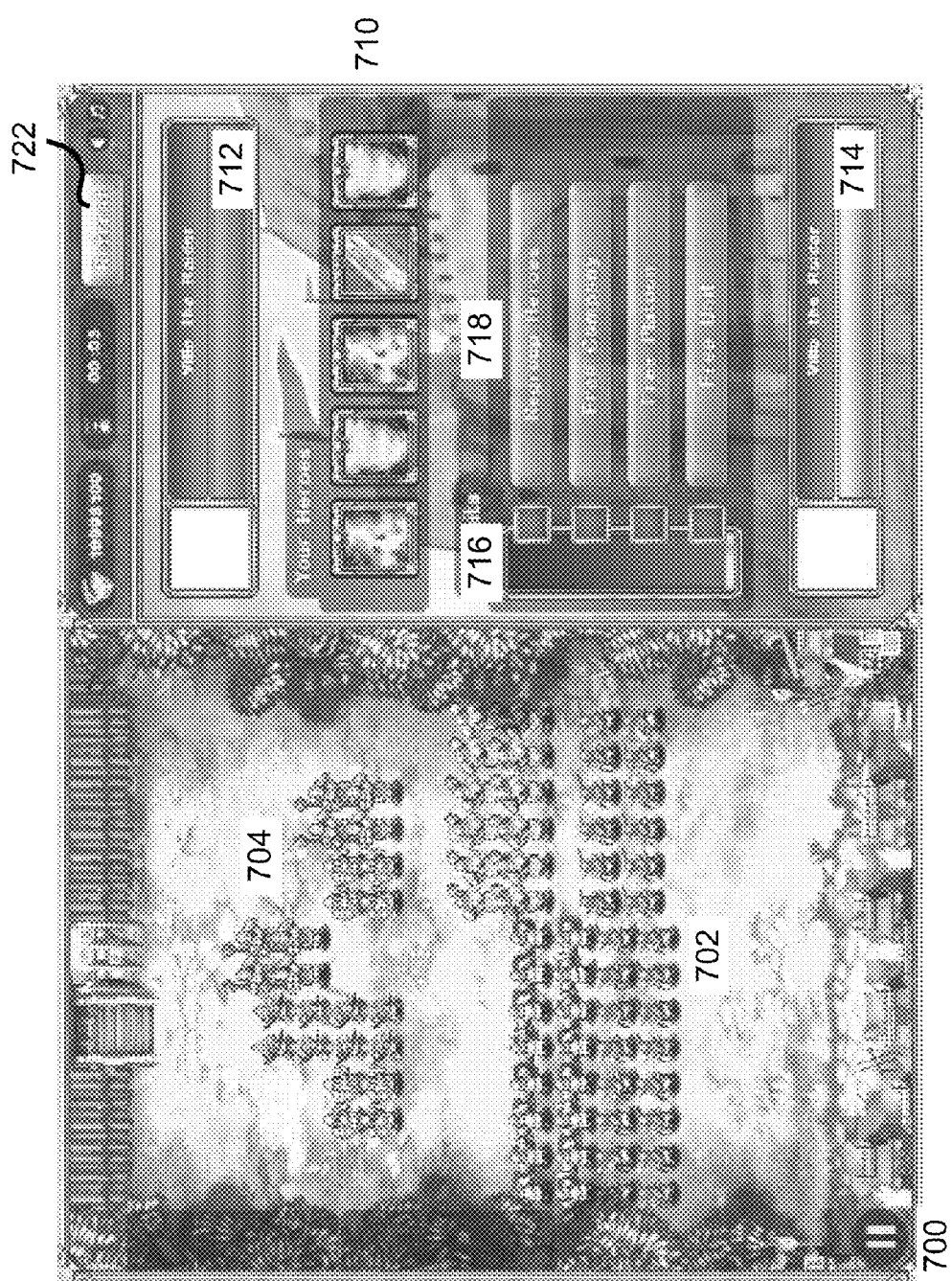
FIG. 7 depicts an exemplary user-side display of a gameplay screen for a game in accordance with an embodiment of the present invention.

When the player clicks the "Begin Battle" button 630, the fight may immediately begin and transition, for example, to an active game instantiation including battle screen 700 shown in FIG. 7. In the battle, the player's (attacking) troops 702 may move automatically forward, for example, without player direction after they start moving. The enemy (defending) troops 704 may stand still until activated. In embodiments, the enemy units and relevant Heroes may be activated automatically when they lose their first unit, and/or the attacking units reach a certain line on the battlefield.

The game may be configured for the objectives to include depleting the enemy morale to zero, e.g. as represented by morale meters 712, 714. Both players may have the same amount of morale to begin with and it may be depleted, for example, when units from the opposing side reach the enemy table end and begin to attack it. The system may be configured to determine that the player who runs out off morale first, loses.

The defender AI may be configured to play the Heroes assigned to the various Guards 422, 424, 426 as detailed above, i.e. in accordance with the predetermined rules of the player represented by the AI. The attacking player may be human-controlled and responsible for using his Heroes in the most effective way to ensure victory in the battle. For example, the Heroes may be used one at a time. After each Hero has been used, the player may be forced to wait a short while ("cooldown") before being able to use another one. If the player uses up all his Heroes, he may be provided with an option to "Regroup" his Heroes, allowing the Heroes to be reused, and/or allowing the system to draw a new selection of Heroes to use. For example, the player may be randomly provided up to 5 Heroes from his selected deck to use at any given time, as shown in the "Your Heroes" bar 710 of FIG. 7. These Heroes may be replaced as used during the game, or they may become unusable. After a predetermined period of time, or other criteria, the user may be given an option of reloading the "Your Heroes" bar 710 by activating the "Regroup Heroes" button. This may be used to allow the user to reuse digital tokens that had already been used during the game.

The Heroes may be used individually by first clicking on the Hero icon the player wishes to use from Hero bar 710, and then, as needed, clicking on the area of the battlefield the player wishes to use the Hero in. Depending on the Hero, the actual conditions and area of effect of each Hero can vary, but all may be used with the same "select-aim-confirm" mouse action. Heroes that are missed (i.e. played outside the battlefield etc) may be returned back to the player "hand". When a Hero is used, it may take effect immediately. If the Hero has a timer before it expires, a small icon may be added to the right edge of the battlefield to show the timer and which effect it stands for. A Warlord Hero 634 may also be provided, as shown in FIG. 6, that does not need to be used but is considered to be in effect for the duration of the entire battle.

Below the Hero icons is the Regroup meter 716. In embodiments, this may be a time-based progress meter that unlocks various free units for the player to deploy as time passes. If the meter 716 is 100% filled, the player gains the option to regroup his Heroes (e.g. "reshuffle" all the used Heroes back and play them again). Before the Regroup is activated, the player may gain access to other lesser options such as, a Free Unit (4 soldiers), Free Platoon (6 soldiers) and a Free Company (10 soldiers), respectively.

The unlocked items in the regroup meter may be used by clicking on the buttons 718 next to the meter. Whenever a button is clicked, the player may immediately gain the bonus and the meter may be reset.

As indicated above, embodiments may include an AI conducting the defense using the Heroes that the defender has digital rights to, and in accordance with pre-established rules and/or configurations set by the player represented by the AI. In embodiments, the defending player may be provided an option of changing the predetermined criteria, such as the Heroes used for defense, the number and types of units, etc. For example, the system may provide the defending player with the option of modifying their defensive options when the attacking player initiates the game, after which, the game may proceed as otherwise described herein. These options may find particular applicability in social networks where the presence of a member "online" may allow for effective communication as well as easy access to the game environment, as well as providing incentives for members to stay online or accessible to their social network accounts.

The player may also be allowed to end the battle before either player wins by clicking on the "Retreat" button 722 in the top right corner of the screen. This may open up a confirmation dialogue where the player can still choose not to retreat. Retreating will end the fight immediately and generate a "Retreated!" event to the target News section, that can generate an option for sending an automated message within the online social network.

After the battle is over, the player may be automatically taken to a debriefing screen. The debriefing screen may show the total amount of gold and experience the player gained from the battle, the casualties on both sides, which treasures the player captured and the possible brags he can send as automated messages to his friends. For example, the battle can may 4 different end results, depending on how the battle went: Domination, Massacre, Win and Lose. A Domination win may be achieved when the player manages to gain all the treasures from the battle. The player may get one treasure from winning, one from ending the game in less than 2 minutes (time bonus), one for causing more casualties than suffering them (less casualties) and one for not suffering any damage on his own base (base unharmed). Each treasure may award the player with an amount of game gold based on the opponent level. A domination victory may also activate an option to send an automated message within the online social network, such as presenting a "Domination Brag" button as part of a user interface, that enables the player to post a "Domination" feed within a component of the online social network. For example, clicking the button may initiate a standard messaging routine within the online social network application and automatically fill in certain information and fields, such as a posting address, special graphics, certificates, and game results. A Massacre result may be achieved when the player wins and the total amount of casualties is over 200. A massacre victory may also activate an option for automated messages, such as a "Massacre Brag" button that enables the player to post a "Massacre" feed within a component of the online social network. A Win result is achieved by winning the game without fulfilling all of the other conditions. This may activate a "Victory Brag" button that enables the player to post a "Victory" feed within a component of the online social network. Thus, players can be given an option to efficiently communicate with other members of the online social network, as well as monitor the progress of other players' performance without having to search around for it. All results may generate a new item to both the enemy and player news areas.

In another embodiment, the system may be configured provide, and/or interact with additional games, such as games that use the same digital tokens for different purposes. For example, a game server may be configured to present and manage a game allowing cards from the standard 52 card deck to be played, with cards from another, Noble, deck, composed of the non-standard digital tokens, being used to modify the play. The system may be configured to allow the Nobles to modify card play in a number of manners. In general, and as described further below, the Nobles may include different functions than those used in the RTS game, such as "traps" that block moves by an opponent, "enhancers" that enhance the value of cards in a player's deck, "swaps" that allow a player to exchange card(s) with an opponent's card(s), and "increment/decrement" cards which allow incrementing or decrementing a player's or opponent's cards.

As with the RTS described above, there are various options that are available in the context of an online social network related to a user's registered friends, and the like. For example, a user may select to play a card game, such as described below, against an AI using the friend's deck of non-standard tokens, or may invite a friend to play for themselves.

Figure 8:
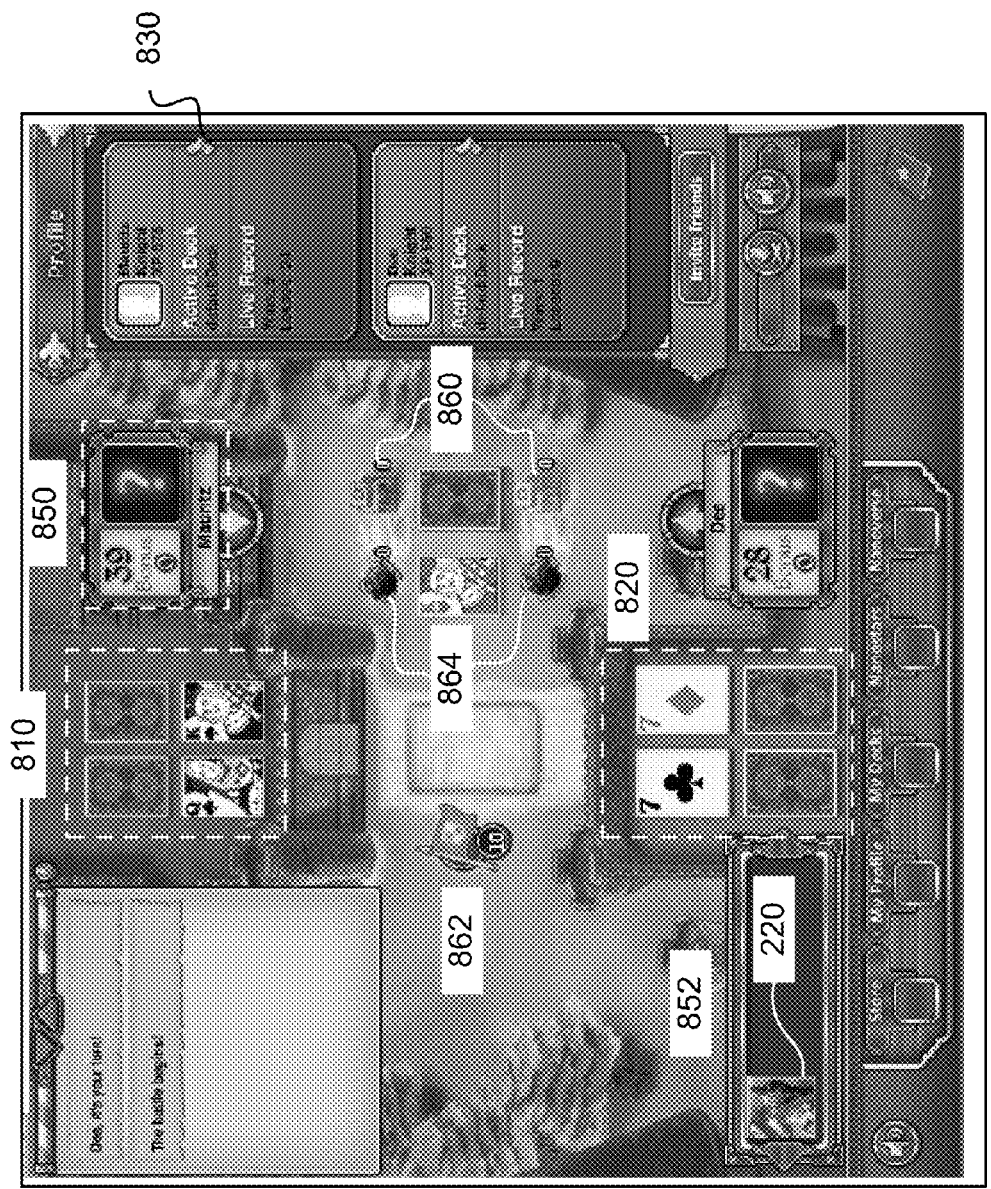
FIG. 8 depicts an exemplary user-side display of a gameplay screen for a game in accordance with an embodiment of the present invention.

As shown in FIG. 8, an exemplary game may begin with the system "dealing" each player four playing cards; two face-up 810, 820 and two face-down. In this example, the object of the game is to modify or replace those four playing cards to have the highest score at the end of the match. A player's score may be calculated by adding up the numbers of each of their playing cards. In embodiments, the system may be programmed such that Jacks are worth 11 points, Queens are 12, Kings are 13, and an Ace is worth 1 point. Other scoring attributes are possible as well.

In order to determine what Nobles a player has access to via, for example, "Active Deck" tab 830 or "My Decks" tab 840, a digital rights management system may be used, for example, by the game server contacting a digital token rights database. Thus, a player may be provided with access to corresponding Nobles, and/or preconfigured decks of Nobles that the player may have stored locally or remotely. In embodiments, a player with no preexisting rights may be granted access to, or provided with, a starter deck including certain, usually low-level, non-standard tokens. For example, a user may be given 20 Nobles to start playing with. In embodiments, users may gain access to additional token by purchasing rights through a digital rights management system. In embodiments, tokens may be bought, rented, traded, and the like. Tokens may be set to expire after a period of time, a number of uses, or other criteria.

In embodiments, a user's non-standard tokens can be used in other games, and can be configured to act, and appear, as a different asset unique to each game. For example, a token 200, as depicted on the left and right side of FIG. 2, may have a generic appearance 210, such as a football player, and a number of game-specific graphical representations 220, 230, as shown below the generic graphic 210. Thus, the token may be depicted in a particular game, such as an RTS game, in a unique manner, as in FIGS. 4 and 5. The game-specific graphic, e.g. 220, 230, may be advantageously configured as a selectable icon to use the token in the game as well, as in FIG. 7. Embodiments may include allowing and/or requiring the user to select a limited number of Nobles from the available Nobles for use in a particular game. For example, a user may have rights to over 20 Nobles, but the game has a hard limit of 20. Therefore, the user must select 20 for play. In other embodiments, the number Nobles available for use in a game may be handicapped depending on factors such as, for example, the respective skill levels of the player.

As shown in FIG. 8, a score meter 850 may be presented on the game screen showing two values. The top number may reflect a total score, and the bottom number may reflect any bonus points or penalties the player has earned. If any playing cards 810 are face-down, and the values unknown to the player viewing the screen, then a score may be estimated in score meter 850 by the computer processor. For example, the programming instructions may specify that when calculating the estimated score, a face-down playing card is considered to be worth 7 points, or the value may be established by the particular user.

During a player's turn, they may, for example, draw Nobles 852 into their hand. This may be done for example by clicking on a user interface including a graphical representation, or thumbnail, of the Noble. A selected, or drawn Noble, may be presented in full size in hand 852, representing its readiness for use by the player, e.g. token 220. A player may draw one Noble at the start of each turn from the pulsing Noble Tower 860. A player may also click on the pulsing "Knock Flag" 862, which triggers the end of the game sequence.

If a player wants to use a Noble, they may click on the "Use" button when viewing the Noble, e.g. 220, from deck 852 in full size. This command may be transmitted to a processor that is executing the game. As known by those of skill in the art, the processing may be performed, for example, by a host remote from the participating user clients, the mechanics of which are not discussed in detail herein. The Noble may then be shown to move to the center of the screen and a determination may be made by the processor whether the effect described on the Noble occurs or not. In embodiments, a player may play any number of Nobles in a given turn. Once a player is holding more than, for example, four Nobles in hand 852, the system may require them to play or discard Nobles until the player has less than four.

Nobles may affect one target or multiple targets, depending on the effect of the Noble. Targets may be playing cards, Nobles, a player's bonus, Traps, etc. Some Nobles may take effect automatically after playing them, while others may require a user to select targets before the effect occurs. The effects of a Noble may also be restricted to a certain type of playing card, such as, for example, a specific suit or color, certain numbers or face-cards, odd or even numbers, or a combination of multiple types. Some Nobles may also target the opponent's hand of Nobles, Noble Towers 860, Noble Pits 864, and Traps.

Nobles may reflect more generic tokens, e.g. persistent characters with specific traits. Nobles may include a variety of attributes that may be generic, or game specific. For example, Nobles may include Clan, Gender, Trap-proof, and/or rarity attributes. These attributes may be used in various ways such as limiting Nobles' effectiveness against other Nobles, making Nobles resistant to certain actions, such as traps, and the like. The traits of a token may be represented on Noble cards with "Tags". Tags may be used by the system to determine whether a Noble is a legal target of another Noble. For example, a Noble being played might only target an opponent's male Nobles. If the opponent doesn't have any male Nobles, the effect will fail, or will fail with respect to Nobles with the Tag "female".

Noble card categories may include, for example:

| Noble Type | Example 1 | Example 2 |
| --- | --- | --- |
| Plus/minus | +5 to each of two target cards. | −3 to each of opponent's cards. |
| Bonus | +1 Bonus. | +1 Bonus for each Spade in play. |
| Fixed | Turn 1 card into a King. | Turns all opponent's face-up Kings into Fives. |
| Kill Playing Card | Kill all opponent black Jacks. | Kill all opponent cards. |
| Kill Modifier | Kill one opponent trap. Cannot be trapped. | Kill all of an opponent's hand of Nobles that are Things, Tech/Black or Wild/Green. |
| Swap playing card | Give a black card in exchange for one opponent's down card. | Exchange one of your red cards for one opponent black card. |
| Steal Playing Card | Steal an opponent's Queen. Cannot be trapped. | Steal one opponent Club. |
| Steal Modifier | Steal the next Noble in opponent's Noble deck and add it to your hand. | Steal all Females from opponent's Noble hand. |
| Trap | Until the end of the game, blocks any Male or Female Nobles that attack your cards. | For the rest of the game has a 50% chance of blocking attacks by Males and Things. |

When targeting is required by a Noble, the system may determine targets meeting the necessary criteria, and the display of all legal targets may be modified, such as by highlighting them with a green border, and the like. If the Noble targets a single playing card, the system may initiate the effect immediately after the user clicks on one card. If a Noble requires multiple targets, the display may be modified to reflect the user clicking on a playing card, such as by changing a highlight to blue. The system may be configured so that clicking the same playing card again deselects it.

In embodiments, potential face-down target playing cards may be displayed differently than face-up cards that are known to be eligible or ineligible targets. For example, face-down cards may have a yellow highlight, indicating that they are potential, but uncertain, targets. These can be selected as targets by the user, but if they don't meet the requirements, the Noble effect will fail. Through similar processes, a player may gain information about what another player's down cards are. In the event that a failed or successful Noble play against a down card results in a logical conclusion regarding, for example, the value or suit of, a down card, the display of the user having access to this information may be modified differently from other users' displays. Likewise, if a player's down, card is known to another player, the player owning the down card may have their display modified in a way that tells the owning player that another player has additional information about that card. Fore example, if an opposing player uses a Noble that automatically changes a down card of player 1, without the new value of the down card being revealed to other players, player 1's display may be changed to include an indicator reflecting that the opposing player knows the value of the down card, even though player 1 may not.

In embodiments, the display may include partial transparency states, for times when a player knows the suit but not the value, or vice versa. As indicated above, this may occur when certain Nobles with predetermined effects, and/or limited applicability are used on face-down playing cards.

In embodiments, the programming instructions may typically provide functions where "plus/minus" Nobles result in modifications to playing cards' values. Similarly, "Bonus" Nobles may provide for separate counts that are summed at the conclusion of a hand. These may include instructions for increasing or decreasing a player's total score by a specific amount, and may be further determined by certain playing cards being in play. "Fixed" Noble may include functions whereby a playing card may be changed in various ways, such as changing the target playing card to a particular value or suit. In embodiments, this can result in a combination of playing cards that are not limited to the combinations present in, for example, a standard 52 card deck. That is, as indicated above, a "Fixed" Noble may turn a playing card into a King, or turn Kings into fives, which may result in more or less Kings and/or fives in play than are typically found in a standard 52 card deck.

"Swap" Nobles may exchange a user's targeted playing card(s) with an opponent's targeted playing card(s), and the like. Whereas, a "Steal" Noble may replace a user's targeted playing card(s) with an opponent's targeted playing card(s), without replacing the opponent's card(s). The system may be configured to replace an opponent's card(s) from the draw pile. "Steal" Nobles may also target an opponent's Nobles in-hand, which do not get replaced. In embodiments, the system may be configured to change possession of "stolen" Nobles temporarily, i.e. during the game, or "permanently", i.e. the digital rights to the token are changed in the database.

Programming instructions may also provide functions where "Kill" Nobles, such as Kill Playing Card and Kill Modifier, can remove playing cards or nobles from a player's hand, consideration and/or play. For example, a Kill Playing Card may "Kill" the target playing card(s) and place it on the bottom of the discard pile, or otherwise remove it from play. Kill Modifier may allow a user to designate an opponent's Noble(s) that are in-hand, e.g. hand 852, making them unavailable for the opponent to use, or otherwise removing them from play. In embodiments, the instructions may not allow "killed" Nobles to be replaced. Other targets of Kill Modifiers may include Noble Towers, Noble Pits, and Traps. In embodiments, the systems and methods may be further configured, and/or include automated processes, to change the display to show both players the targeted Noble(s) when Noble(s) are killed and/or stolen, so that both players know what was killed/stolen.

"Trap" Nobles may be configured to take effect subsequent to when they are played. For example, a "Trap" Noble may be responsive to an opposing player's action, waiting to be triggered. In general, the system may be configured to establish rules upon use of the "Trap" to prevent or restrict some future action/use of an opponent. Traps may prevent certain types of Nobles from taking effect when the opponent plays them, and may be configured to be consumed after being triggered once, while others may be configured to last for a predetermined time or number of uses, or the whole game.

Figure 9:
FIG. 9 depicts an exemplary user-side display of a game in accordance with an embodiment of the present invention.

As shown in FIG. 9, embodiments may include calculating one or more user scores by score meters 350, 354 and the like based on attributes of the standard and non-standard tokens, including modified-attributes of the tokens, and determining a winner of the game based on the calculated user scores shown in score meters 350, 354. User profiles may be updated in a database to reflect the results of the game, including, for example, modifying in the database a score representing a player's skill and the like. Such scores can then be used later to perform other automated tasks such as matching players by skill, and the like.

In embodiments, a virtual trading card game, such as described herein, may be played on a social networking site. Appropriate software may be downloaded to a client computer and can interact with other client's and/or servers, through the network, e.g. the Internet, to connect with other players who also downloaded the same client program. Embodiments may also include providing a user with the option to send invites to friends, which may include a link for downloading the game. Game instructions may be configured to calculate an effect of a token based on a number of invited friends playing a game, a number of networked friends playing a game, and the like. Embodiments may also include downloading all, or part, of the game to personal computers, mobile phones, and similar devices with sufficient processing power and connectivity.

As mentioned above, digital tokens may be used in multiple games with game-specific functions. For example, tokens used in the above-described card game may also be used in another game such as RTS game with a battlefield portion of the screen and a token-use portion of the screen, as shown in FIG. 7, and described above. Gameplay in the battlefield portion of the screen may be influenced by the user's activation of token functions, that result in different functions than those used in the card game for the same generic token. For example, the use of a Hero in the RTS game may influence a speed, strength, and/or health of a unit, whereas using the corresponding Noble in the card game may alter the possession of a standard token, or other effect.

Embodiments may include various combinations of the following features. Tokens may be disposable in nature with a certain number of uses or a specific pattern of wear. Tokens may get improved attributes and performance as a function of how many of a user's friends on a social network are playing with the user or have been invited by the user. Custom decks for a given game may be the same for opponents or different, e.g. they can be regulated by handicap budgets of how many points of value are allowed, budgets related to other attributes of the tokens, and the like. Decks and gameplay can be organized around a variety of handicapping methods so that social players can level the playing field and compete in tournaments, e.g. handicapping allowable tokens and/or token effects based on competitive rank, the value of a player's total collection of tokens, etc. Additional attributes of tokens may provide expanded features such as including storylines and related events and functions within games, special rules for decks that unlock unique functionality, such as "clan decks" that require a certain percentage, such as 50%, of its members to be from that clan, and that enable inter-clan and intra-clan competitions and tournaments. Token use may also be tracked by a server and rewards, such as additional tokens and/or functionality, provided to the user and/or user's token based on milestones such as total games played, different types of games used in, victories, etc. Complimentary tokens may have display options such as a "FREE" banner, a dull appearance, and the like, that can be changed once the user purchases the token, thereby encouraging the user to purchase the token. A digital token rights management system may include a user exchange allowing the digital rights to tokens to be bought, sold, and/or traded by users via the digital token rights management system and recorded in the rights database:

Games may include instructions for allowing different tokens to be used together for unique combined effects. Thus, for example, using tokens 260 and 270 shown in FIG. 2 together in one game might result in a combination function "X", whereas tokens 260 and 270 may not be combinable in another game, or may result in an altogether different combination function "Z". The complexity of such combinations is advantageously used in the context of automated computer games, without the need for the user to learn all such possibilities to monitor their own play or that of another player. Additionally, having the game run by a computer server allows for "surprise" combinations that the user was unaware of, which is not as feasible in conventional games where each player generally knows the rules, possible combinations, and effects.

Embodiments of the present invention can include systems for implementing the described methods, as well as computer-readable storage medium coded with instructions for causing a computer to execute the described methods. For example, an electronic system including a processor, a memory and an electronic communication device may be configured to control an online game including providing standard and non-standard tokens to the players of the game, as described herein. The system may include a user computer system, wireless communication devices, subnetworks, a server, or any other network-capable device with the requisite functional capabilities.

The system includes any number of processors (not shown) that are coupled to storage devices including a first storage (not shown, typically a random access memory, or "RAM"), second storage (not shown, typically a read only memory, or "ROM"). Both of these storage devices may include any suitable type of the computer-readable media described and/or mentioned above. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The system may also include an interface that includes one or more input/output devices such as such as video monitors, track balls, mice, keyboards, microphones, touch-sensitive displays, transducer card readers, magnetic or paper tape readers, tablets, styluses, voice or handwriting recognizers, or other known input devices, including other computers. The system may be coupled to a computer or other electronic communication network using a network connection. The network can connect various wired, optical, electronic and other known networks to exchange information among computers, servers, wireless communication devices, and sub-networks. With such a network connection, it is contemplated that the system and the processor therein may receive information from the network, or may output information to the network in the course of performing the above-described method steps. The above-described devices and materials will be familiar to those of skill in the computer hardware and software arts and need not be individually or exhaustively depicted to be understood by those of skill in the art. The hardware elements described above may be configured to act as one or more modules for performing the operations described above.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The following tables show additional details of exemplary digital tokens labeled according to "Nano Name".

TABLE 1

| Nano Name | Noble Name | Nano ID | Noble Type | Description | Race | Tag | Rarity (From Fed) |
|---|---|---|---|---|---|---|---|
| HeHateMe | War of the Roses | 1 | Swap playing card | Swap any 2 of your Spades with any 2 opponent cards. | Yellow | Male | R |
| Edison | Magnetism | 2 | Steal Modifier | Steal top Noble from opponent Noble discard pile. Cannot be trapped. | Yellow | Male | R |
| MoneyHoney | Treasure | 3 | Bonus | +1 Bonus for each Spade in play. | Yellow | Female | R |
| Nanny | Blackmail | 4 | Fixed | Turn one King into a Jack of Spades. | Yellow | Female | C |
| Toaster | Murder Hole | 5 | Plus/Minus | −5 to one face-up card. | Yellow | Male | C |
| King Bling | Golden Apple | 6 | Bonus | +1 Bonus. | Yellow | Male | C |
| Mischief | Stepmother | 7 | Swap playing card | Swap one of your cards for an opponent's Spade. | Yellow | Female | C |
| DesperateSoccerMom | Six in the City | 8 | Fixed | Turn opponent's face-down cards into Sixes. | Yellow | Female | U |
| Napoleon | Siege | 9 | Plus/Minus | −3 to each of opponent's cards. | Yellow | Male | R |
| Parts | Lingerie | 10 | Trap | Trap: Until the end of the game, blocks any Male or Female Nobles that attack your cards. | Yellow | Female | R |
| Doctor | Surgery | 11 | Plus/Minus | +5 to each of two target cards. | Yellow | Female | U |
| Blondie | Makeover | 12 | Fixed | Turn all your Spades into Queens. | Yellow | Female | U |
| YouAreSoFired | Guillotine | 13 | Kill playing card | Kill all opponent face-down Kings. | Yellow | Male | C |

TABLE 1-continued

| Nano Name | Noble Name | Nano ID | Noble Type | Description | Race | Tag | Rarity (From Fed) |
|---|---|---|---|---|---|---|---|
| Jennifer | Jealousy | 14 | Fixed | Turn each opponent Jack into a 3. | Yellow | Female | U |
| NotDeadYet | (Coming Soon) | 15 | Plus/Minus | Can not be trapped. (Coming Soon) | White | Male | R |
| Justin | Romance | 16 | Steal Playing Card | Steal an opponent's Queen. Cannot be trapped. | White | Male | U |
| Detroit | Factory | 17 | Fixed | Turns all cards into Spades. Cannot be trapped. | Yellow | Male | U |

TABLE 2

| Nano Name | Noble Name | Nano ID | Noble Type | Description | Race | Tag | Rarity (From Fed) |
|---|---|---|---|---|---|---|---|
| Aspirin | Antidote | 18 | Plus/Minus | +2 to each of your Spades. | Yellow | Female | C |
| Nonpology | Six Scandel | 19 | Fixed | Turns every opponent red King into a Six. Cannot be trapped. | Yellow | Male | U |
| Sherlock | Golden Key | 20 | Kill Mod | Kill one opponent trap that is City/Yellow or Elemental/Blue. Cannot be trapped. | Yellow | Male | C |
| Brad | Jackdom | 21 | Fixed | All your cards become Jacks. | Yellow | Male | R |
| Frankenstein | Monster | 22 | Steal Modifier | Steal all Females from opponent's Noble hand. | Yellow | Male | U |
| FreeShipping | (Coming Soon) | 23 | Plus/Minus | (Coming Soon) Cannot be trapped. | Yellow | Male | R |
| MinuteMan | (Coming Soon) | 24 | Plus/Minus | (Coming Soon) Cannot be trapped. | Yellow | Male | R |
| NoYouDon't | Drawbridge | 25 | Trap | Trap: For the rest of the game has a 50% chance of blocking attacks by Males and Things. | Yellow | Female | U |
| Aladdin | Magic Lamp | 26 | Fixed | Choose any 3 cards. Those that are red turn into Kings. | White | Male | R |
| VooDoo | Hex | 27 | Fixed | Turn all face-up opponent black cards into Aces. Cannot be trapped. | White | Male | U |
| Jim | Cult | 28 | Kill playing card | Kill all your own cards. | White | Male | C |
| Mick | Apprentice | 29 | Fixed | Turn your face-up cards into Tens. | White | Male | C |
| Phantom | Masked Ball | 30 | Trap | Trap: Blocks and captures one Female Noble. | White | Male | U |
| Venus | Holy Hand Grenade | 31 | Kill Mod | Kill one opponent trap. Cannot be trapped. | White | Female | U |
| IMHO | Henry | 32 | Kill playing card | Kills all opponent Queens. | White | Male | R |
| GoodluckWith That | Wet Blanket | 33 | Trap | Trap: 50% chance to block the next opponent Noble played. | White | Female | C |

TABLE 3

| Nano Name | Noble Name | Nano ID | Noble Type | Description | Race | Tag | Rarity (From Fed) |
|---|---|---|---|---|---|---|---|
| Godiva | Bareback | 34 | Fixed | Turn one red card into a Queen. | White | Female | U |
| Joan of Arc | Bewitched | 35 | Kill playing card | Kill an opponent black card and replace from the top of the discard pile. | White | Female | U |
| Eleniel | Elven Magic | 36 | Bonus | +1 Bonus for each of your Hearts. Cannot be trapped. | White | Female | R |
| Lady of the Lake | Offering | 37 | Fixed | Turn one Heart into a King. | White | Female | U |
| Zombie | Resurrection | 38 | Steal Modifier | Recover a used Noble from the top of your Noble discard pile. | White | Thing | R |
| Cinderella | Fairy Godmother | 39 | Fixed | Turn all your Hearts into Queens. Cannot be trapped. | White | Female | R |
| Merlin | Magic Shield | 40 | Trap | Trap: Until the end of the game, block any Nobles attacking your cards. | White | Male | R |
| Excalibur | Crusader | 41 | Fixed | Turn 1 card into a King. | White | Male | U |
| Cupid | Arrow Slit | 42 | Fixed | Turn your face up cards into Hearts. | White | Male | C |
| Pedro | Acolyte | 43 | Fixed | Turn all cards into Hearts. | White | Male | U |
| Wiz | Wizardry | 44 | Kill Mod | Kill all opponent traps. Cannot be trapped. | White | Male | R |
| Yogi | Hypnosis | 45 | Swap playing card | Give a black card in exchange for one opponent's down card. | White | Male | C |
| Santa | Gifts | 46 | Bonus | +1 Bonus for each Heart in play. Cannot be trapped. | White | Male | R |

TABLE 3-continued

| Nano Name | Noble Name | Nano ID | Noble Type | Description | Race | Tag | Rarity (From Fed) |
|---|---|---|---|---|---|---|---|
| IComeInPeace | Call It a Draw | 47 | Kill playing card | Kill all opponent cards. | Black | Thing | R |
| Mother-in-Law | Witch | 48 | Fixed | Turns all opponent's face-up Kings into Fives. | White | Female | U |
| Finn | Scout | 49 | Steal Modifier | Steal al Elemental/Blue Nobles from an opponent's hand. Cannot be trapped. | White | Male | U |

TABLE 4

| Nano Name | Noble Name | Nano ID | Noble Type | Description | Race | Tag | Rarity (From Fed) |
|---|---|---|---|---|---|---|---|
| MTFBWU | Hero | 50 | Steal Modifier | Steal all Tech/Black or Spirit/White Nobles from an opponent's hand. | Black | Male | R |
| 86 | Secret Agent Man | 51 | Trap | Trap: Blocks and captures one City/Yellow, or Wild/Green Noble played by opponent. Cannot be trapped. | Black | Male | R |
| Mega Fox | Bombshell | 52 | Trap | Trap: 50% chance to block each of the next two Nobles played by an opponent. | Black | Female | R |
| CIA | Waterboarding | 53 | Trap | Trap: Blocks and captures one Noble that is either Spirit/White or Elemental/Blue. | Black | Male | U |
| BumbleBeetle | Plate Armor | 54 | Trap | Trap: For the rest of the game, block any attacking Nobles that are Things. Cannot be trapped. | Black | Thing | C |
| RC | Remote Control | 55 | Steal Modifier | Capture one opponent trap. | Black | Female | R |
| Foobar | Iron Mask | 56 | Kill playing card | Kill all opponent black Jacks. | Black | Thing | C |
| Spam | Tavern | 57 | Swap playing card | Exchange one of your odd cards for one of your opponent's even cards. | Black | Thing | U |
| Wally | Nice Guy | 58 | Fixed | Turn an 8 into a Queen. Cannot be trapped. | Black | Male | C |
| Crash | Blackout | 59 | Kill Mod | Kill all Tech/Black, City/Yellow or Female Nobles in an opponent's hand. Cannot be trapped. | Black | Thing | U |
| Cookie | Morsel | 60 | Plus/Minus | +2 to each of your cards that are Diamonds. | Blue | Thing | C |
| Octomom | Crazy Eights | 61 | Fixed | All cards become Eights. | Yellow | Female | U |
| Black Knight | Run Away | 62 | Kill playing card | All red cards are killed. | Black | Male | U |
| Governator | Barbarian | 63 | Fixed | Turn 2 target cards into Twos. | Black | Male | R |

TABLE 5

| Nano Name | Noble Name | Nano ID | Noble Type | Description | Race | Tag | Rarity (From Fed) |
|---|---|---|---|---|---|---|---|
| AYBABTU | UFO | 64 | Fixed | Turn all opponent red face-down cards into Fives. Cannot be trapped. | Black | Thing | C |
| ASL | Weird Science | 65 | Fixed | Turn an even card into a Queen. | Black | Female | U |
| Jerry | Frog Prince | 66 | Fixed | Turn any 2 black cards into Kings. | Black | Male | R |
| WTH | Purse | 67 | Bonus | +1 Bonus for each of your black cards. Cannot be trapped. | Black | Female | R |
| Cray-Z | Bard | 68 | Kill playing card | Kill-target opponent black card. | Black | Thing | C |
| LOL | Minstrel | 69 | Swap playing card | Exchange one of your red cards for one opponent black card. | Black | Female | U |
| Lord Brutish | Chivalry | 70 | Fixed | Turn a Two into a Jack. | Black | Male | C |
| ADD | Tweet | 71 | Plus/Minus | +1 to one card. | Black | Thing | C |
| FAQ | Falcon | 72 | Fixed | Peek at an opponent's face-down cards. | Black | Female | C |
| Kamikaze Robot | Assassination | 73 | Kill Mod | Kill all Tech/Black Nobles from an opponent's hand. | Black | Thing | C |
| Tesla | Jackrabbit | 74 | Fixed | Turn two black cards into Jacks. | Black | Male | U |
| OMG | Gold | 75 | Bonus | +2 Bonus for each of your even cards. | Black | Female | R |
| KFP | Roasted Guinea Pig | 76 | Kill playing card | Kill all opponent cards that are not Clubs. | Green | Female | R |
| Skunk | Stinkbomb | 77 | Plus/Minus | −4 to all face-up opponent cards. Cannot be trapped. | Green | Female | R |
| Scarlett | Fountain of Youth | 78 | Plus/Minus | +4 to one card. | Green | Female | C |

TABLE 5-continued

| Nano Name | Noble Name | Nano ID | Noble Type | Description | Race | Tag | Rarity (From Fed) |
|---|---|---|---|---|---|---|---|
| Savage | Beating | 79 | Bonus | −1 Bonus to an opponent for each Club in play. Cannot be trapped. | White | Male | R |
| Pa-Kow | Bludgeon | 80 | Plus/Minus | −3 to one card. | Green | Male | C |
| Bottom Feeder | Hag | 81 | Kill playing card | Replace 1 of your cards with the bottom card of the discard pile. | Green | Female | C |
| Cougar | Clubbing | 82 | Bonus | +1 Bonus for each of your Clubs. | Green | Female | U |

TABLE 6

| Nano Name | Noble Name | Nano ID | Noble Type | Description | Race | Tag | Rarity (From Fed) |
|---|---|---|---|---|---|---|---|
| Scorpion | Backstab | 83 | Kill Mod | Kill all opponent Nobles that are Female, City/Yellow, or Elemental/Blue. | Green | Female | U |
| JK | Trojan Horse | 84 | Kill playing card | Kill all opponent face-down Royalty. Cannot be trapped. | Green | Male | R |
| Shizzledog | Pit Bull | 85 | Steal Playing Card | Steal one opponent Club. | Green | Male | C |
| Orc | Invader | 86 | Bonus | −1 Bonus to opponent for each of their cards that is not a Club. | White | Male | U |
| JumpTheShark | Gallows | 87 | Trap | Trap: Blocks one Wild/Green Noble. Cannot be trapped. | Green | Thing | C |
| Crazy Penguin | Catapult | 88 | Kill Mod | Kill all of an opponent's hand of Nobles that are Things, Tech/Black or Wild/Green. Cannot be trapped. | Green | Male | U |
| Macbeth | Tragedy | 89 | Kill playing card | Kill all face-up Royalty. | Green | Male | U |
| Gizelle | Beauty | 90 | Trap | Trap: Blocks and captures the next Male Noble played by an opponent. | Green | Female | R |
| Predator | Hunting | 91 | Steal Modifier | Capture one opponent trap if it is City/Yellow. | Green | Male | C |
| Vlad | Executioner | 92 | Kill playing card | Kill any 3 cards. | Green | Male | R |
| Pocahontas | Forest | 93 | Fixed | Turn any 2 cards into Clubs. | Green | Female | C |
| Pell Mell | Raid | 94 | Kill Mod | Kill one opponent trap that is Wild/Green, Spirit/White, or Tech/Black. Cannot be trapped. | Green | Male | U |
| KTHXBI | Flogging | 95 | Kill playing card | Kill all your own cards that are not Clubs. | Green | Female | C |
| Robin Hood | Foreign Trade | 96 | Swap playing card | Swap one of your cards with one opponent face-up card. | Green | Male | R |
| Hysteria | Anthrax | 97 | Kill playing card | Kill opponent's face-down cards. Cannot be trapped. | Green | Female | R |

TABLE 7

| Nano Name | Noble Name | Nano ID | Noble Type | Description | Race | Tag | Rarity (From Fed) |
|---|---|---|---|---|---|---|---|
| ManRam | Beast | 98 | Fixed | Turn your face-down cards into Queens. | Green | Male | U |
| Ogre | Bad Breath | 99 | Fixed | Turn one opponent King into a Two. | Green | Male | U |
| Spartacus | Dagger | 100 | Plus/Minus | −2 to target face-up card. | Green | Male | C |
| Booty | Wench | 101 | Fixed | Turn your Clubs into Tens. | Green | Female | C |
| MindTheGap | Moat | 102 | Trap | Trap: For the rest of the game, blocks 80% of ground attacks (attacks that are not flying or airborne). Cannot be trapped. | Green | Thing | U |
| Diamond | Jewelry | 103 | Trap | Trap: For the rest of the game, blocks any Female Nobles played by opponent. Cannot be trapped. | Blue | Female | U |
| Shotokeki | Shortcake | 104 | Trap | Trap: Blocks 1 Spirit/White, City/Yellow, or Elemental/Blue Noble and puts it on the top of its original deck. Cannot be trapped. | Blue | Thing | C |
| Death Dealer | Kiki | 105 | Kill playing card | Kill 2 cards. | Blue | Female | U |
| Dealer | Laboratory | 106 | Fixed | Turn any 2 cards into Diamonds. Cannot be trapped. | Blue | Male | U |
| LowCarb | Meat Pie | 107 | Plus/Minus | −1 to one card. | Blue | Female | C |

TABLE 7-continued

| Nano Name | Noble Name | Nano ID | Noble Type | Description | Race | Tag | Rarity (From Fed) |
|---|---|---|---|---|---|---|---|
| Nurse | Healing Water | 108 | Plus/Minus | +3 to one card | Blue | Female | C |
| Java | Instant Coffee | 109 | Fixed | Turn your black cards into Diamonds. | Blue | Thing | U |
| Szechwan | Explosives | 110 | Kill playing card | Kill all Spades. | Blue | Thing | C |
| IDidNotInhale | Smoke | 111 | Plus/Minus | −5 to an opponent's odd cards. | Blue | Male | R |
| Virus | Infection | 112 | Kill Mod | Kill one opponent Male Trap. Cannot be trapped. | Blue | Female | C |

TABLE 8

| Nano Name | Noble Name | Nano ID | Noble Type | Description | Race | Tag | Rarity (From Fed) |
|---|---|---|---|---|---|---|---|
| Frosty | Blizzard | 113 | Kill playing card | Kill all of opponent's face-up Royalty. | White | Thing | U |
| Sauce | Grog | 114 | Trap | Trap: 70% chance to block the next two Male Nobles played by an opponent. Cannot be trapped. | Blue | Thing | U |
| YoHo | Pirate | 115 | Steal Modifier | Steal the next Noble in opponent's Noble deck and add it to your hand. | Blue | Male | U |
| ThatsWhatSheSaid | Ladies In Waiting | 116 | Fixed | Turn all your Diamonds into Queens. Cannot be trapped. | Blue | Male | R |
| BoomGoesTheDynamite | Incoming | 117 | Plus/Minus | −3 to each opponent card that is not a Diamond. Cannot be trapped. | Blue | Thing | R |
| Rushmore | Legacy | 118 | Fixed | Select any 4 cards. If they all are Red, they turn into Kings. Cannot be trapped. | Blue | Male | R |
| Axle | Arsonist | 119 | Plus/Minus | −4 to all opponent face-up cards that are not Diamonds. | Blue | Male | R |
| Taxman | Shakedown | 120 | Plus/Minus | −2 to all opponent cards. Cannot be trapped. | Blue | Male | R |
| Wasabi | Fire | 121 | Trap | Trap: 50% chance to block and capture the next Noble played by an opponent. One time use only. Cannot be trapped. | Blue | Thing | U |
| Goodybag | Tiara | 122 | Bonus | +1 Bonus for each of the Diamonds in play. | Blue | Female | R |
| Dope | Intrigue | 123 | Swap playing card | Exchange 1 of your odd cards for an opponent Royalty. | Blue | Male | U |
| Dark | Void | 124 | Fixed | Turn all your cards face-down. Cannot be trapped. | Blue | Thing | C |
| The Don | Hitman | 125 | Kill playing card | Kill any 2 opponent cards. Cannot be trapped. | Blue | Male | R |
| The Cleaner | Steamy | 126 | Fixed | Turn all of your red cards into Kings. | Blue | Male | R |
| FUD | Lite | 127 | Fixed | Turn all cards face-up. Cannot be trapped. | Blue | Thing | C |

TABLE 9

| Nano Name | Noble Name | Nano ID | Noble Type | Description | Race | Tag | Rarity (From Fed) |
|---|---|---|---|---|---|---|---|
| Hammer | Blacksmith | 128 | Fixed | Turn all your face down cards into Diamonds. | Blue | Male | C |
| Loviatar | Disease | 129 | Kill playing card | Kill all Clubs. | Blue | Female | C |
| Rock | Coup | 130 | Kill playing card | Choose 3 opponent cards; any that are Jacks are killed. Cannot be trapped. | Blue | Male | U |
| JunkInTheTrunk | Fortifications | 131 | Trap | Trap: For the rest of the game, blocks 50% of attacks. Cannot be trapped. | Blue | Female | U |
| ROTFL | Architect | 132 | Fixed | Turn all your Aces, Twos, and Threes into Kings. | Black | Female | U |
| Africa | Forces | 133 | Fixed | Reveal an opponent's face-down cards and make each one into an Ace of Diamonds. | Blue | Thing | R |
| Roach | Espionage | 134 | Fixed | Peek at an opponent's face-down cards and make them Spades. Cannot be trapped. | Yellow | Male | C |
| OCD | Distraction | 135 | Kill Mod | Kill all Elemental/Blue or Spirit/White Nobles in an opponent's hand. | Black | Male | C |

TABLE 9-continued

| Nano Name | Noble Name | Nano ID | Noble Type | Description | Race | Tag | Rarity (From Fed) |
|---|---|---|---|---|---|---|---|
| NerdBurger | Brotherhood | 136 | Bonus | +2 Bonus for each of your cards that are 8 or less. | Black | Male | R |
| Jolt | Fire Power | 137 | Plus/Minus | +8 to target Ace, Two, Three or Four. Cannot be trapped. | Black | Thing | U |
| Pamela | Bikini | 138 | Trap | Trap: Until the end of the game, 90% chance to block each Male Noble. | Yellow | Female | R |
| Blackbeard | Pillage | 139 | Steal Playing Card | Steal a Diamond from your opponent. | Yellow | Male | C |
| Posh | Penthouse | 140 | Swap playing card | Choose up to 2 opponent cards that are Jacks or Kings to trade with any 2 of your cards. | Yellow | Female | R |
| Watson | Confession | 141 | Fixed | Reveal opponent's face down cards. | Yellow | Male | C |
| W00t! | Rags to Riches | 142 | Fixed | Select 3 cards. Any that are Clubs will turn into Kings. Cannot be trapped. | Green | Male | R |

TABLE 10

| Nano Name | Noble Name | Nano ID | Noble Type | Description | Race | Tag | Rarity (From Fed) |
|---|---|---|---|---|---|---|---|
| Hercules | Brute Force | 143 | Bonus | −3 to an opponent's Bonus. Cannot be trapped. | Green | Male | R |
| Amoeba | Plunder | 144 | Steal Modifier | Steal all Wild/Green Nobles from opponent hand. Cannot be trapped. | Green | Thing | U |
| Priestess | Hail Mary | 145 | Fixed | Peek at an opponent's face-down cards and make them Hearts. | White | Female | C |
| Grunge | Pied Piper | 146 | Steal Playing Card | Steal one Heart from your opponent. | White | Male | C |
| Hater | Hack | 147 | Steal Modifier | Steal all Spirit/White Nobles from an opponent's hand. Cannot be trapped. | Black | Male | U |
| Catholic School Girl | Exorcism | 148 | Kill Mod | Kill all Nobles in opponent's hand except for Elemental/Blue ones. | White | Female | R |
| Puck | Trickster | 149 | Fixed | Turn any card into a 9. | White | Male | C |
| Karma | Good Vibrations | 150 | Plus/Minus | +1 to each of your Hearts. | White | Female | C |
| Kung Fu | Pandemonium | 151 | Kill playing card | Kill any playing card. | White | Male | C |

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. A method of providing computer-implemented games in coordination with a computer-implemented social network comprising:
   providing, by a computer processor, instructions for displaying a first display to a user, the first display including a plurality of icons including a first icon and a second icon,
   wherein the first icon represents a first member of the social network that is a friend of the user in the social network and that is playing the game; and
   the second icon represents a second member of the social network that is not a friend of the user in the social network and that is playing the game,
   receiving a selection of the first icon and/or the second icon by the user, and
   implementing and beginning a first session of a first game with the user based on the received selection by the user, the first session being implemented such that the first session includes at least one game parameter predetermined by the first member or the second member of the social network, wherein for at least a portion of the first session of the first game, gameplay by the first member or the second member is simulated based on the at least one predetermined game parameter determined based on the received selection of the user, such that for at least a portion of the first session, a participant of the first session does not include the first member or the second member of the social network, and
   wherein the at least one predetermined game parameter includes a selection by the first member or the second member of the social network, prior to the first session of the first game, of one or more digital tokens for use in the first session, the one or more digital tokens being selected from digital tokens that the first member of the social network or the second member of the social network has rights to, such that the at least one predetermined game parameter for the first session is determined based on selection of the one or more digital tokens by the first member or the second member and selection of the first icon and/or the second icon by the user.

2. The method of claim 1, further comprising:
   sending a friend request to the second member of the social network on behalf of the user in response to the selection by the user selecting the second icon;

in response to the second member of the social network accepting the friend request,
registering the second member of the social network as a new friend of the user in the social network.

3. The method of claim 1, wherein:
the first session is implemented such that the user plays an offensive role in the first session against a simulated player acting as a corresponding one of the first member or the second member of the social network, the simulated player being in a defensive role in the first session; and
the simulated player executes, by a computer processor, actions determined by attributes of the one or more digital tokens and according to at least one predetermined game rule set by the first member or the second member of the social network.

4. The method of claim 1, further comprising providing a different set of uses for individual ones of the one or more digital tokens in another game.

5. The method of claim 1, further comprising:
providing the user with at least one standard token from a first set of tokens, the first set of tokens being shared and substantially identical between a plurality of users playing the first game;
verifying, by a computer processor, rights of the user to non-standard tokens from a second set of tokens;
providing the user with at least one non-standard token from the second set of tokens based on said verifying;
receiving over an electronic network a first instruction from the user to use the at least one non-standard token during the first game;
based on the first instruction, executing by a computer processor a second instruction that modifies an attribute of at least one of a standard token provided to one of the plurality of users playing the first game and a non-standard token provided to one of the plurality of users playing the first game;
restricting the further use of the non-standard tokens that have been used by the user; and
after a period of time, providing the user with an option to make the used non-standard tokens useable again.

6. The method of claim 5, wherein the first set of tokens consists of a pool of possible tokens corresponding to units for a real-time strategy game.

7. The method of claim 6, wherein the second instruction modifies an attribute of a standard token provided to one of the plurality of users, the modified attribute including a health score of a unit.

8. The method of claim 6, wherein the second instruction modifies an attribute of a standard token provided to one of the plurality of users, the modified attribute including a movement speed of a unit.

9. The method of claim 5, wherein the computer-implemented game is provided in coordination with a social networking site.

10. A non-transitory computer-readable storage medium including instruction for causing a computer to perform a method comprising:
providing, by a computer processor, instructions for displaying a first display to a user, the first display including a plurality of icons including a first icon and a second icon,
wherein the first icon represents a first member of the social network that is a friend of the user in the social network and that is playing the game; and
the second icon represents a second member of the social network that is not a friend of the user in the social network and that is playing the game,
receiving a selection of the first icon and/or the second icon by the user, and
implementing and beginning a first session of a first game with the user based on the received selection by the user, the first session being implemented such that the first session includes at least one game parameter predetermined by the first member or the second member of the social network, wherein for at least a portion of the first session of the first game, gameplay by the first member or the second member is simulated based on the at least one predetermined game parameter, such that for at least a portion of the first session, a participant of the first session does not include the first member or the second member of the social network, and
wherein the at least one predetermined game parameter includes a selection by the first member or the second member of the social network, prior to the first session of the first game, of one or more digital tokens for use in the first session, the one or more digital tokens being selected from digital tokens that the first member of the social network or the second member of the social network has rights to, such that the at least one predetermined game parameter for the first session is determined based on selection of the one or more digital tokens by the first member or the second member and selection of the first icon and/or the second icon by the user.

11. The computer-readable storage medium of claim 10, the instructions further comprising:
sending a friend request to the second member of the social network on behalf of the user in response to the selection by the user selecting the second icon;
in response to the second member of the social network accepting the friend request,
registering the second member of the social network as a new friend of the user in the social network.

12. The method of claim 1, wherein,
the first session includes a first set of tokens including first tokens, the first set of tokens being shared and identical between the user and an opposing player opposing to the user in the first session, and a plurality of second sets of tokens, the individual ones of the plurality of second sets of tokens including second tokens that are associated with a respective one of the user and the opposing player, the first session being further implemented such that execution of the first session includes;
determining at least one of the first tokens for assignment to the user and the opposing player;
receiving from at least one of the user and the opposing player an instruction indicating an use of at least one of the second tokens associated with the one of the user and the opposing player;
implementing by a computer processor a first rule in the first online game based on the use of the at least one of the second tokens, the first rule including modifying an attribute of the at least one of the first tokens assigned to one of the user and the opposing player; and
determining a winner of the first online game based on the modified attribute.

13. The method of claim 12, wherein the opposing player is one of a member of the computer-implemented social network or a simulated player using at least one predetermined game rule set by a member of the computer-implemented social network.

14. The method of claim 1, further comprising:
presenting in the first session of the first game that the user may select use of a digital token;
implementing by a computer processor a first rule in the first session of the first game based on a use of the digital token selected by the user;
implementing and beginning a second session of a second game with the user, the second session including a presentation that the user may select use of the digital token, wherein the second session includes at least a different presentation and a different set of rules from the session; and
implementing by a computer processor a second rule in the second session based on a use of the digital token selected by the user.

15. The method of claim 14, wherein:
the first session includes presenting the user with a display including cards from a standard 52 card deck assigned to individual users playing the game;
the first rule in the first session includes modifying an attribute of at least one of the cards assigned to the users playing the game; and
the second online game includes a real-time strategy gameplay.

16. The method of claim 14, wherein the first online game and the second online game are provided in coordination with a social networking site.

* * * * *